(12) United States Patent
Wheeler

(10) Patent No.: US 6,606,482 B1
(45) Date of Patent: Aug. 12, 2003

(54) ADAPTIVE PERSONAL ROUTING IN A WIRELESS COMMUNICATION NETWORK

(75) Inventor: Gilmore S. Wheeler, Potomac, MD (US)

(73) Assignee: Mobilnet Corporation, Potomac, MD (US)

( * ) Notice: Subject to any disclaimer, the term of this patent is extended or adjusted under 35 U.S.C. 154(b) by 0 days.

(21) Appl. No.: 09/667,533

(22) Filed: Sep. 22, 2000

(51) Int. Cl.⁷ .................................................. H04B 7/15
(52) U.S. Cl. ........................ 455/11.1; 455/445; 370/351
(58) Field of Search ................................. 455/432, 433, 455/435, 445, 11.1, 517; 370/238, 351, 315

(56) References Cited

U.S. PATENT DOCUMENTS

| | | | |
|---|---|---|---|
| 5,151,900 A | * 9/1992 | Snyder et al. | 370/94.3 |
| 5,247,701 A | * 9/1993 | Comroe et al. | 455/334 |
| 5,521,910 A | * 5/1996 | Matthews | 370/94.1 |
| 5,742,905 A | * 4/1998 | Pepe et al. | 455/461 |
| 5,757,783 A | * 5/1998 | Eng et al. | 370/315 |
| 5,790,938 A | * 8/1998 | Talarmo | 455/11.1 |
| 5,812,951 A | * 9/1998 | Ganesan et al. | 455/445 |
| 5,825,772 A | * 10/1998 | Dobbins et al. | 370/396 |
| 5,890,054 A | * 3/1999 | Logsdon et al. | 455/11.1 |
| 6,023,733 A | 2/2000 | Periasamy et al. | |
| 6,160,804 A | * 2/2000 | Ahmed et al. | 370/349 |
| 6,044,062 A | * 3/2000 | Brownrgg et al. | 370/238 |
| 6,055,431 A | * 4/2000 | Dybdal | 370/392 |
| 6,084,858 A | * 7/2000 | Matthews et al. | 370/238 |
| 6,108,551 A | * 8/2000 | Lehmusto et al. | 455/450 |
| 6,212,185 B1 | * 4/2001 | Steeves et al. | 370/392 |
| 6,266,339 B1 | * 7/2001 | Danahue et al. | 370/432 |
| 6,360,076 B1 | * 3/2002 | Segura et al. | 455/67.1 |

* cited by examiner

*Primary Examiner*—Edward F. Urban
*Assistant Examiner*—Tilahun Gesesse
(74) *Attorney, Agent, or Firm*—Piper Rudnick LLP; Steven B. Kelber

(57) ABSTRACT

A system and method for supporting wireless telecommunications networks that provide fixed, portable and fully mobile high-speed, secure communications is disclosed. The invention including the systems and methodology disclosed is called Adaptive Personal Router (APR). APR permits analog and digital signals including voice, video and data to be dynamically forward routed through the network to achieve the best open path using a variety of metrics.

14 Claims, 3 Drawing Sheets

ADAPTIVE PERSONAL ROUTING IN A WIRELESS COMMUNICATION NETWORK

BACKGROUND OF THE INVENTION

1. Field of the Invention

The present invention is directed to systems and methods for supporting wireless telecommunications networks that provide fixed, portable and fully mobile high-speed, secure communications. Particularly, the present invention relates to systems and methods for routing signals through such wireless telecommunications networks. Still more particularly, the present invention, called Adaptive Personal Router (APR), permits analog and digital signals including voice, video and data to be dynamically forward routed through the wireless network to achieve the best open path using a variety of metrics.

2. Description of the Related Art

In the past, certain limited aspects relevant to the present invention have been proposed, such as in the following prior art patents:

U.S. Pat. No. 6,044,062 to Brownrigg et al. discloses a wireless network system including a gateway server having a server controller and a server radio modem, and a number of clients each including a client controller and a client radio modem. The server controller implements a server process that includes the receipt and the transmission of data packets via the radio modem. The client controllers of each of the clients implements a client process that includes the receipt and transmission of data packets via the client radio modem. The client process of each of the clients initiates, selects, and maintains a radio transmission path to the server that is either a direct path to the server, or is an indirect path or "link" to the server through at least one of the remainder of the clients. The process disclosed in Brownrigg et al. preferably optimizes the link to minimize the number of "hops" to the server.

Brownrigg et al. differs from the present invention in that although it suggests employing one or more clients to link transmission to the gateway server, it does not include any method or system whereby the path is polled for available bandwidth, or response time. Furthermore, Brownrigg et al. includes no mechanism for dynamically tailoring the transmission routing for individual clients, but rather discloses a method of monitoring all clients and servers in the entire network. In addition, the invention of Brownrigg et al.is specifically designed to operate in a fixed environment.

The present invention includes the ability to adjust transmission path as a result of polling individual clients and the gateway server for such information as response time, signal strength, data throughput, and available bandwidth, thereby providing a continuously optimized connection based on any combination of such data. Furthermore, the present invention is specifically designed to operate in a mobile environment, and includes a method and system for evaluating the effect of location changes, again by polling relevant locations for various data as response time, signal strength, data throughput, and available bandwidth.

U.S. Pat. No. 6,023,733 Periasamy, et al., assigned to Cisco Technology, discloses a method of determining efficient path routing in a computer network. Through the use of a hierarchical representation of a computer network including subnetworks, the invention of Periasamy et al. includes the ability to evaluate portions of a network more efficiently than by mapping the entire network topology. However, since Periasamy et al. only address fixed computer networks, it is designed only for wired networks. As such, the invention of Periasamy et al. does not include the ability of the present invention to monitor changes in mobile unit location, and track, gather data, and update the effects of mobile unit movement on transmission path efficiency.

Known wireless networks such as the "Ricochet" Network operated by Metricom of Los Gatos, Calif., include a wireless network of packet radio communication nodes which are designed as intelligent, autonomous and peer radio transmission and relay stations, that transmit, acknowledge and relay autonomous packets among themselves, typically in a multiple channel environment where the transmitters and receivers frequency hop among channels in a trackable, pseudo random pattern. The typical and default communication mode is random access. The Ricochet Network is an integrated hardware and software system operating entirely within the Industrial Scientific and Medical (ISM) Bands. As such, the Ricochet Network is not a managed network, and further is limited in its ability to increase available bandwidth to individual users. Also, the system intelligence is not located in the individual user devices.

Objects of the Invention

In order to meet the above-identified needs that are unsatisfied by the prior art, it is a principal object and purpose of the present invention to provide a system and method for adaptive personal routing in a wireless network.

It is a further object of the present invention to provide a method and system for adaptive personal routing that monitors and responds to changes in multiple data such as available bandwidth, signal strength, throughput, and response time, to provide a network of continually optimized transmission paths.

Another object of the present invention is to provide the above system using a system of designated "neighbor" units to provide an efficient adaptive personal routing system and method of wireless telecommunication.

In a preferred embodiment, it is an object of the present invention to provide a system and method for employing available bandwidth as a criterion for conducting adaptive personal routing.

In another preferred embodiment, it is an object of the present invention to provide a system and method for using response time as a criterion for conducting adaptive personal routing.

In another aspect of a preferred embodiment, it is an object of the present invention to employ signal strength and throughput as criteria for conducting adaptive personal routing.

These and other objects of the invention, as well as a fuller understanding of the advantages thereof, can be had by reference to the following description and claims.

GLOSSARY OF TERMS

While dictionary meanings are also implied by certain terms used here, the following glossary of some terms used herein which relate to our invention may prove to be useful:

1. Gateway Server: a machine connecting a wireless network to another network, which may be another wireless network, or a wired network such as the public switched telephone network (PSTN) or an internet protocol-based network such as a local area network or a wide area network.

2. Throughput (TP): data transmitted per unit of time.

3. Available Bandwidth (ABW): the gateway server throughput available per mobile unit if one more mobile unit is added to the existing mobile units on that server.

4. Response Time (RT): the average length of time it takes for a response from a specific gateway server to arrive at a specific mobile unit.

5. Minimum ABW (minABW): the mobile unit service level bandwidth guarantee.

6. TCP/IP: Transmission Control Protocol/Internet Protocol, the suite of communications protocols used to connect hosts on the telecommunications networks and computer networks including the Internet.

SUMMARY OF THE INVENTION

The Adaptive Personal Router of the present invention is based on the concept that in a network, any specific wireless device need only communicate with a neighboring device in order to communicate throughout the network. The device picks routes based upon which neighbor has the better metric. If one device changes, only its neighboring devices need to reestablish their metrics to reflect the change. This dramatically cuts down on central processing unit (CPU) cycles and overhead traffic on the wireless network. This system and method can be easily distinguished from prior art wireless designs that depend solely on hop count and direct routes or indirect routes to a server device. By contrast, APR can continue to maintain communication with its neighbors even though a gateway server device ceases to exist while waiting for a new gateway connection to appear. A wireless device having multiple neighbors would choose its preferred route by rating each responding neighbor's supplied metrics.

The algorithmic approach to network routing is Adaptive Personal Routing (APR). APR can be integrated into any radio operating on any frequency. This approach makes the user radio responsible for all routing decisions on its behalf and allows other users, also using APR and associated software, to route through it, as a repeater, to a gateway server to the internet. APR will adapt, dynamically, and reroute if a better route becomes available or an existing route is broken. In general, APR provides a local delivery system which allows access to the Internet or any Internet accessible network. A network using APR actually becomes more robust in terms of service to users as more users join the network. This is because when using APR, users actually become, as repeaters, part of the overall wireless network delivery system.

DETAILED DESCRIPTION OF A PREFERRED EMBODIMENT

Figure 1:
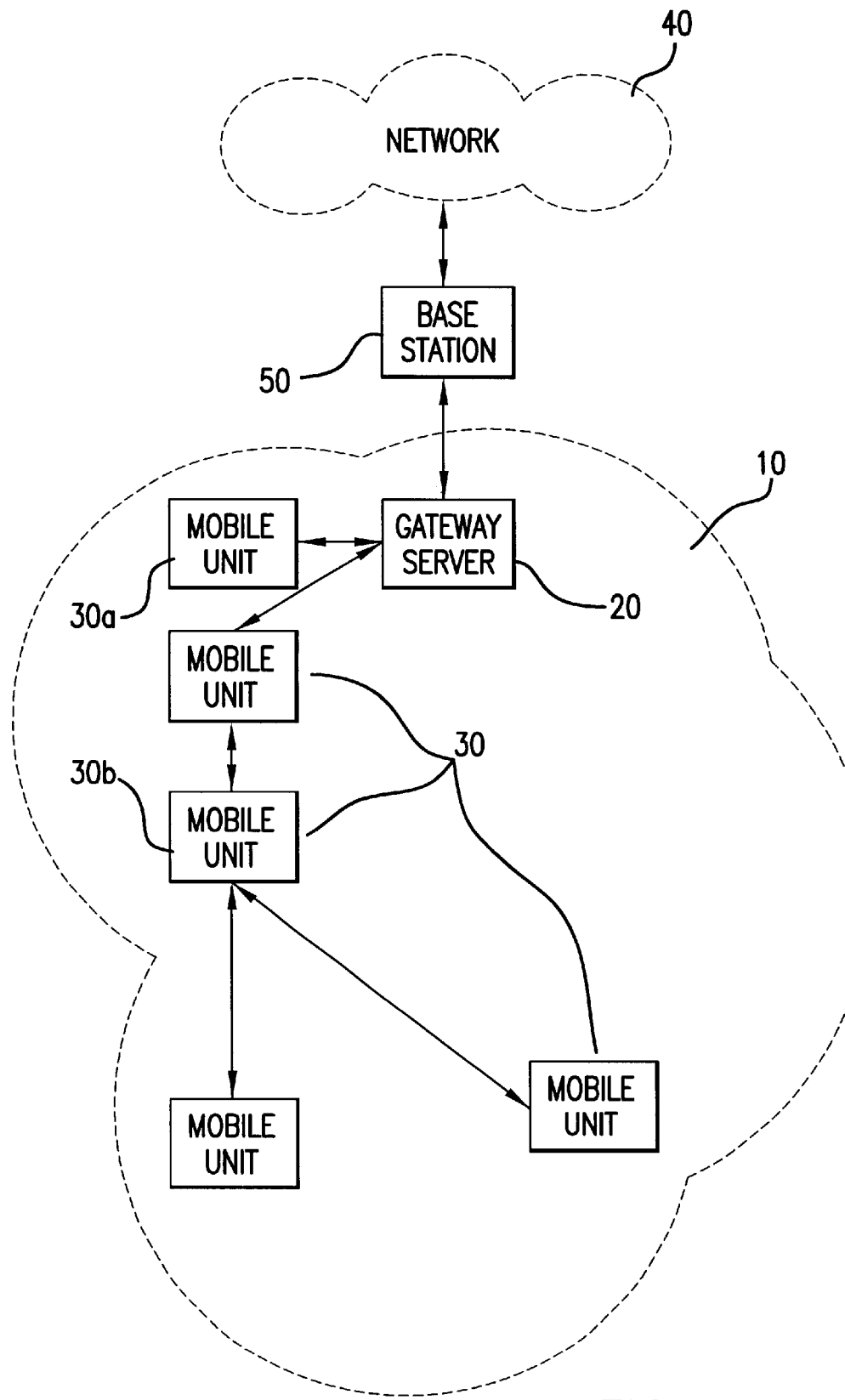
FIG. 1 is a diagram of a wireless network.

FIG. 1 depicts a wireless telecommunications network 10 including a gateway server 20 that controls traffic for a plurality of mobile units 30. As depicted in FIG. 1, the mobile units 30 may in the present invention communicate directly with the gateway server 20 as in the case of mobile unit 30a, and they may also communicate directly with other mobile units 30, as in the case of mobile unit 30b. In any wireless network, each mobile unit must receive signals directly or indirectly from a central source such as a gateway server, and it must also transmit directly or indirectly to a central source, especially in order to communicate with other networks. The adaptive personal routing system and method of the present invention takes advantage of this inherent requirement and capacity of mobile telecommunications units to provide a continuously optimized routing method.

The gateway server 20 serves the dual purpose of controlling communications between mobile units within a single wireless network 10 and also directing telecommunications traffic between its own network and another network such as depicted by 40 in FIG. 1. In typical practice, the connection to other networks will be made through base station equipment 50 including high capacity broadband transceiver systems (BTS) that are intended to service a relatively large number of active mobile stations in each cell of a wireless telecommunications network.

Figure 2:
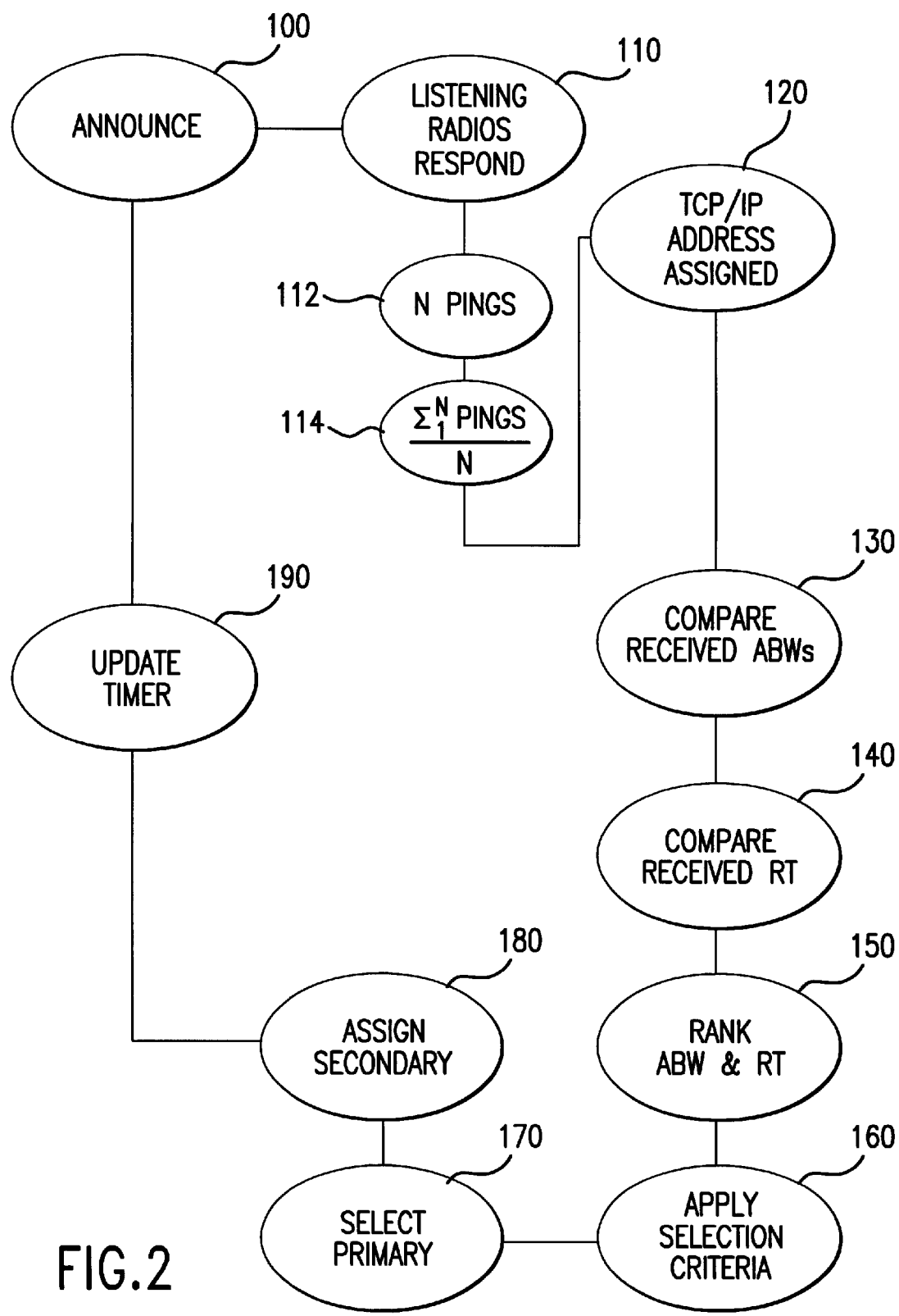
FIG. 2 is a flowchart of the algorithm used in the system and method of Adaptive Personal Router of the present invention.

Referring now to FIG. 2, the method of conducting adaptive personal routing in a preferred embodiment of the present invention occurs as follows:

In step 100, a mobile unit 30 radio announces, or broadcasts its desire to join the existing wireless network. Each radio that can hear the broadcast and that is connected to a gateway server will respond in step 110 giving its TCP/IP address, its ABW and its RT. In accordance with the principles of the present invention, the ABW broadcast by a particular radio will be that of the server it is connected to assuming that a new mobile unit 30 is added. The RT is initially obtained by the mobile unit 30 by "pinging" the server a specific number of times in step 112 and averaging the responses in step 114. Subsequently, RT will be obtained by averaging the actual response times achieved from the server. No radio will respond unless it can offer an ABW greater than equal to the predefined minABW. In the preferred embodiment, the new mobile unit 30 will receive its session-based TCP/IP address under the Dynamic Host Configuration Protocol (DHCP) in step 120.

Further in FIG. 2, in step he newly connected mobile unit 30 will choose a radio to connect to based upon which specific one is offering an acceptable level of ABW and an acceptable RT, as compared respectively in steps 130 and 140. As will be appreciated by those of ordinary skill in the relevant art, acceptable levels will vary depending on the application, e.g., during a data file transfer—ABW is important, RT is less so; during an interactive query and response—RT is a priority relative to ABW; and in high data throughput applications such as streaming video and video conferencing ABW and RT are both important.

Therefore, the Adaptive Personal Routing system and method of the present invention will analyze responding radios based upon the reported ABW that exceeds a minimum threshold and the reported RT that is below a maximum threshold. The responding radios are ranked (sorted high to low) based upon ABW and RT in step 150. The mobile unit 30 radio that first meets the selection criteria defined in step 160 (which is based on the selection criteria and signal priorities discussed), will be selected in step 170. In step 180 the second-ranked radio based on the selection criteria applied in step 160 is subsequently designated as the first alternate in the case that the initial connection with the radio selected in step 170 breaks. If there is no responding radio meeting the predetermined threshold criteria, the algorithm can default to the best available choice and wait for a better choice to appear or simply accept no service at this time.

In the embodiment shown in FIG. 2, each mobile unit 30 will regularly update, or broadcast its existing ABW and RT. This is accomplished at a regular interval determined by the update timer element in step 190. This updating, or feedback step will permit the Adaptive Personal Routing system and method of the present invention to detect and select an improved primary route to the gateway server at any time, resulting from any change in metrics. Typically, the updating will occur at intervals of several milliseconds or less, thereby providing mobile unit users with an apparently continuously updated and optimized network routing.

EXAMPLE 1

Figure 3:
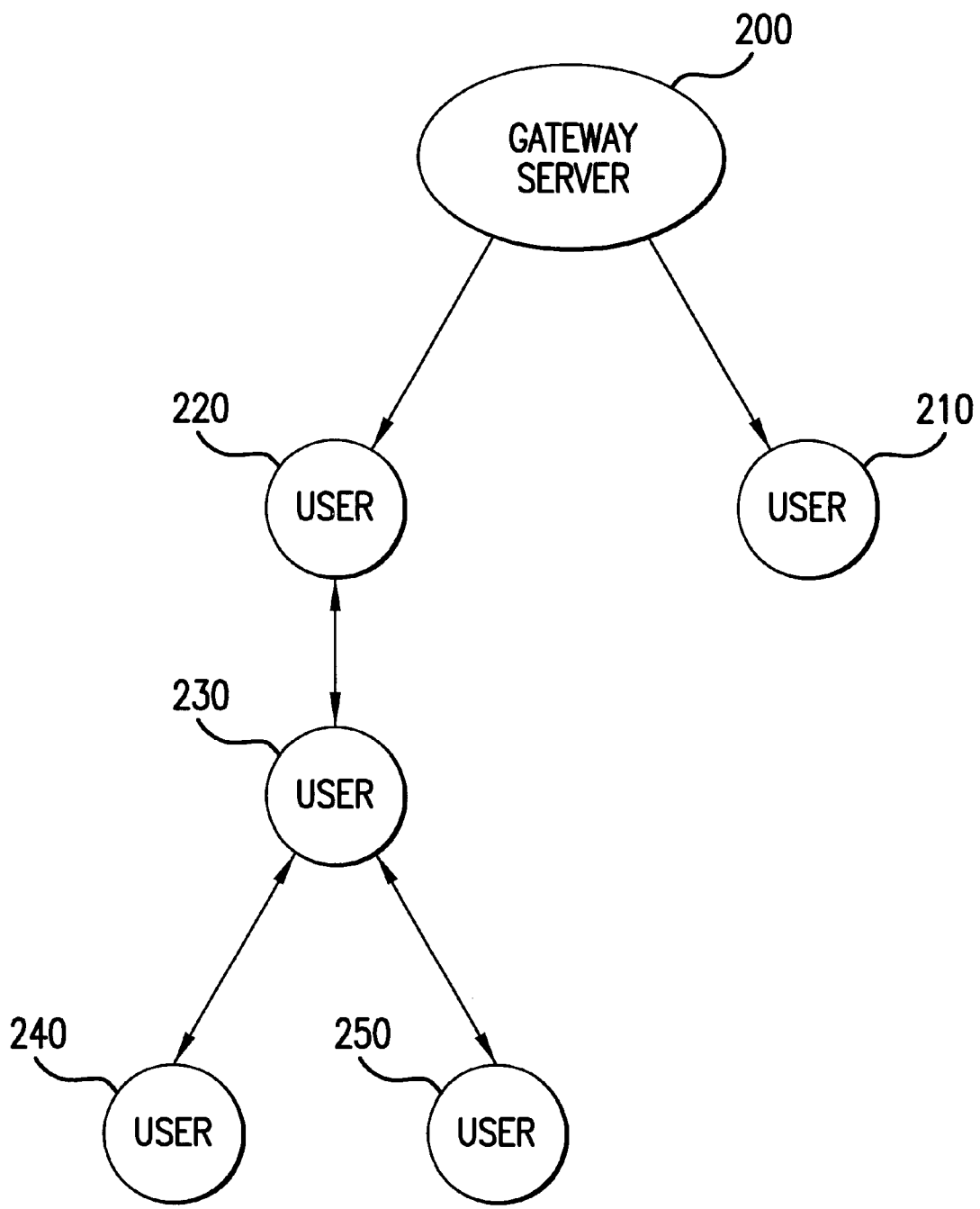
FIG. 3 shows a graphic depiction of a specific preferred embodiment of the system and method of Adaptive Personal Router of the present invention.

The invention may be further understood by reference to the following example, graphically depicted in FIG. 3.

In the embodiment shown in FIG. 3, each mobile unit radio 210–250 in the network only knows which other mobile unit radios or gateway server 200 it is directly connected to and which mobile unit radio 210–250 or gateway server 200 is directly connected to it. The number of actual hops to a server is irrelevant in the adaptive router of the present invention. Servers, by definition, directly connect to no one but can be directly connected to, or joined, by a number of radios, in the example users 210 and 220. Users can directly connect only to one radio, a server or a user, but can be directly connected to, or joined, by a number of users. In the example, the gateway server 200 is aware of users 220 and 210, user 220 is aware of the gateway server 200 and user 230. User 230 is aware of users 220, 240 and 250. Each radio is responsible for informing those directly connected to it of changes which effect ABW and RT. Thus, when the gateway server 200 has a change of ABW, it will pass the changes to users 210 and 220; 220 will pass the changes to 230; 230 will pass the changes to 240 and 250. If user 230 experiences a break in connection with user 220 and has to reroute, it will notify users 240 and 250 of any changes in ABW or RT, which may mean connection to a completely different gateway server(not shown). If a mobile user attaches to another radio, any radio which is attached to it or through it must advertise that it is mobile. In other words, the mobility of one user affects all users attached behind it and may affect the choice of a new user to attach to any of these radios.

User radios connect to gateway server 200 in the order shown in FIG. 3, i.e., 210 first, 220 second, etc. In the example depicted, all radios, whether located in mobile units 210–250 and/or gateway server 200, are 2 MB devices. Before user 210 connects to the Gateway Server 200, the ABW advertised by the server is 2 MB, RT=0. The Adaptive Personal Router at user 210 makes a decision that this is as good as it gets and connects to the gateway. When user 210 connects, he gets the gateway's full 2 MB. At this point, both the gateway server 200 and user 210 will advertise an ABW=to 1 MB (i.e., 2 MB/2, or 2 MB divided by the existing user plus the next new one) to new users requesting responses. The RT of the gateway will still be zero and that of user 210 would be something greater. If the next user, 220, considering a connection to this gateway can hear both the server and user 210, its APR will obviously choose the gateway server 200, if only for the preferred RT of zero. If it can only hear user 210, then the Adaptive Personal Router of the present invention will analyze the advertised ABW of 1 MB in conjunction with the RT delay because user 220 now has to hop through user 210 to get to the gateway server 200. In the example, user 220 hears the gateway and chooses a direct connection to the gateway server 200.

As further shown in FIG. 3, user 230 including the Adaptive Personal Router has selected a path to the same gateway but has only heard user 220. This means that the RT of hopping through user 220 is acceptable and the now advertised ABW (by users 210, 220 and the gateway) of ⅔ MB is also a best choice. User 240 hears only user 230 and the Adaptive Personal Router accepts the additional delay in RT and the reduced gateway server throughput of 500 kb, the now advertised ABW of users 210, 220, 230 and the gateway server 200. User 250 might be able to hear users 230 and 240. However, users 210, 220, 230, 240 and the gateway all advertise the same ABW of ⅖ MB. The discriminator applied by the Adaptive Personal Router is that connecting to 230 instead of 240 will give a lower RT, and so 230 is chosen.

In accordance with the principles of the present invention, in this example all users are guaranteed a minABW of 128 kbs (2 MB=2,048 MB in reality). Thus, minABW=128 kbs=16 users of a 2 MB channel. Therefore, the ABW metrics proposed in this example are worst case. Most Internet traffic is in fact bursty and will not eliminate many others from sharing the same bandwidth. As an example, wired Internet access providers, using modems, use a ratio of users to modems of anywhere from eight to ten (called an Ehrlang ratio). This would lead to a simultaneous user load of 16×8=128. Therefore, the example ABW reported by a Gateway Server 200 and connected users is understated and should be adjusted by some factor based upon something less than the standard Ehrlang ratio.

In the present invention, signal strength is also factored when evaluating ABW decisions. Poor signal strength will affect the user throughput rate to the server even though there is a high ABW. If poor signal strength cannot be avoided by simply choosing another route, then the ability to dynamically change packet size becomes important. Larger packet sizes in a bad signal environment actually reduce transmission speeds because of the overhead required in error detection and retransmission. Similarly if the signal strength gets better, then the ability to enlarge packet sizes becomes desirable. Persons of ordinary skill will recognize that such considerations may be made through software installed in the hardware used in the adaptive personal routing system and method of the present invention.

EXAMPLES 2a–2c

It is further contemplated that typically and even necessarily in wireless networks, server radios will be of larger throughput capacity than user radios. This will affect the ability of the network to serve different numbers of users, especially when multiple users are connected to the network in series, i.e. in a "chain." The Adaptive Personal Router of the present invention accounts for this feature of typical wireless networks with algorithms directly addressing both servers and users in the network. The relationships are quantified as mathematical expressions and/or decision trees in the following examples:

Server (S) Algorithms:

Let X=the size of the server (assumed in this example to be in multiples of 2 MB). Let Y=the size of an individual user (assumed to be two MB). It is anticipated that eventually, users will become larger and user throughputs may vary. Servers will have varying throughputs depending on traffic requirements, i.e., some radios at Post Office Protocol (POP) server sites will be larger, i.e., have more capacity than others.

X/Y="m" blocks of Y dimension. Let "n"=the number of directly attached radios to the POP server radio. For n<m, the Available Band With of the server is ABW(S)=(m−n) * Y MB. For $n \geq m$, ABW(S)=X/(n+1).

EXAMPLE 2a

Assume that X=8 and Y=2. Then "m"=4. This means that there are 4"blocks" of 2 MB available to any users wishing to connect to the network at the server. For "n"=0, the server has no directly attached users. The ABW(S) advertised by the server is (4−0)*2 MB=8 MB, the full capacity of the server. For "n"=1, the ABW(S)=(4−1)=3*Y=6 MB, i.e., the first user has occupied the first 2 MB block. For "n"=2, ABW(S)=4 MB. For "n"=3, ABW(S)=2 MB.

For "n"=4, the Adaptive Personal Router algorithm switches to ABW(S)=X/(n+1)=8/5 MB. This switch is significant because at this point the bandwidth available to the previously directly connected users will be lessened below their basic 2 Mb capacity. This will continue as more directly connected users are added.

For "n"=5, ABW(S)=8/6=4/3 MB. For "n"=6, ABW(S)=8/7 MB. For "n"=7, ABW(S)=8/8=1 MB, etc.

User (U) Algorithms

When any user hops through other users to get to a server, that user's throughput to the server is necessarily limited, or throttled by the directly connected user that the user passes through. In these cases, multiple connected users may create a "chain" of users passing through a directly connected user. A given server radio may in fact have several chains of users hopping through several different directly connected users, where each directly connected user is attached to one of several "blocks" of bandwidth $\leq Y$, subject to signal strength. Thus, except upon handling extreme loads, the server radio will broadcast ABWs larger than the ABW announced by attached users. It is important to note that all users in a "chain" will report the same ABW. The difference between user radios in a "chain," which can also be connected to or joined by new users, will be signal strength and response times to the server.

Using the definitions given above, the throughput of the server—TP(S)—is as follows:

$$TP(S)=Y \text{ for } n \leq m \text{ and } TP(S)=X/n \text{ for } n>m.$$

Therefore, the ABW(U)=TP(S)/(k+2), where k is the number of radios attached (in a chain) to a directly connected user.

EXAMPLE 2b

Assume, as above, that X=8 and Y=2, then m=4. For n ≤4, TP(S)=Y=2. If, for example, n=7, TP(S)=8/7 MB. If k=5, i.e., there is a chain of six users including the directly connected user radio, then ABW(U)=8/7 divided by 7=8/49 MB, or approximately 163 kB.

Selecting Routes

When a specific user broadcasts that it wants to join the network, it receives a session-based TCP/IP address from the DHCP server. All radios—users and servers—that can hear the new user wishing to join the network respond with their TCP/IP addresses, their ABW, and their RT. The Adaptive Personal Router of the "new" radio first adjusts the ABWs based upon signal strength SS (0>SS≦1). The APR then ranks the adjusted ABWs from high to low. It then selects all responses within a predetermined or computed range Δ. The actual Δ used is not important, and can vary depending on varying characteristics of the network such as geographic/geologic conditions, equipment sensitivity, traffic, and even network managers' personal preferences for signal strength and bandwidth selection, among other factors. The APR of the "new" user then ranks the selected responses (those that were within the desired Δ) by RT. In other words, in this embodiment of the Adaptive Personal Router, RT is a tie breaker. The first ranked response is assigned by the APR as the chosen path. The APR designates the second ranked response as the first alternate path if the first ranked path breaks.

Routing, or path information is constantly being updated by the Adaptive Personal Router as existing paths change. Therefore both the best path and the alternate paths can change. As contemplated by the Adaptive Personal Router of the present invention, each user radio is constantly looking for better first and second routes and will switch dynamically without interruption to the user.

Algorithms Determining When New Users can not be Added:

The algorithms detailed above demonstrate how to compute the server and user ABW. At some point, no new users can be added either directly to the server or to a chain of users because the result will cause the service levels provided to existing users to drop below a specific and likely predetermined minimum guaranteed service level. In the Adaptive Personal Router of the present invention, these "shutdown" metrics are independent of one another, i.e., a "chain" of users can shut down—prohibit the addition of new users—before a server shuts down, and vice versa. Conversely, it is contemplated that under certain circumstances, servers and/or chains of users including the Adaptive Personal Router may not shut down at all.

Each chain, "i" connected to a server has a total guaranteed bandwidth, $G(i)=\Sigma g(k)$, where k equals the number of user radios in the chain including the directly connected user radio.

Max G(i)=the largest G(i) among the several chains which may be attached to a server.

Note that these G(i) can change as users are added to or deleted from a particular chain.

The Adaptive Personal Router of the server will stop allowing new users to directly connect to it when the ABW of the server is less than max G(i), i.e., max G(i)<ABW(S).

A chain will stop adding new users to it when the available bandwidth of the chain, ABW(C)<G(i).

In the Adaptive Personal Router of the present invention, these shut down metrics work for connections of radios having different minimum service levels.

EXAMPLE 2c

Assume that a network employs an eight megabit server radio. Attached to this radio are three chains:

Chain 1 has four radios in it (including the directly attached radio) with service guarantee levels of 0.5, 0.125, 0.125 and 0.125 MB. G(1)=0.875 MB.

Chain 2 has three radios with service guarantee levels of 0.125 MB each. G(2)=0.375.

Max G(i)=G(1)=0.875 MB. The server can have up to 9 directly connected users, i.e., 8/9=0.889 MB, a $10^{th}$ user would only get 0.8 MB<0.875 MB=G(1).

At this point, The server is maxed out and so is Chain 1 as it cannot add another user or it would provide service levels below the minimum. Chain 2, however, is not maxed out. With a total of nine radios directly connected to the server, Chain 2 has 0.889/4=0.2223 MB available for the next user which is greater than the minimum guarantee of 0.125 MB. In fact, under these conditions, Chain 2 can attach up to 7 user radios, including the directly attached radio, before it maxes out, i.e., 0.889/7=0.127 MB. An eighth user would drive the chain below the minimum at 0.1111 MB.

The Adaptive Personal Router of the present invention contemplates that the attachment of radios to one another is a random event based upon the selection of an optimal path at a particular instant in time. Again, as these paths change, all the metrics will change also. Thus, a closed chain or server can open up again.

While the invention has been described and illustrated herein by references to various specific embodiments, it is understood that the invention is not restricted to those particular embodiments and descriptions selected for that purpose. It will, however, be evident to those skilled in the art that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An adaptive router system comprising:
    a gateway server;
    a plurality of mobile units, at least one of said plurality of mobile units being in direct communication with said gateway server, each of the mobile units comprising
        means for announcing its presence to neighboring mobile units;
        means for receiving a plurality of desired criteria from neighboring mobile units having an available bandwidth per mobile unit not less than a guaranteed minimum bandwidth;
        means for comparing said plurality of desired criteria; and
        means for selecting a path to said gateway server based on the comparison of said plurality of desired criteria, the path having a minimum guaranteed bandwidth.

2. The adaptive router system of claim 1, wherein said plurality of desired criteria include at least one of available bandwidth, response time, signal strength, and data throughput.

3. The adaptive router system of claim 1, wherein said means for selecting a path to said gateway server is located in each of said plurality of mobile units.

4. The adaptive router system of claim 1, wherein said network is a wireless network.

5. The adaptive router system of claim 1, wherein at least one of said plurality of mobile units is a radio frequency unit.

6. A method for adaptive routing of signals in a network having members including a gateway server and a plurality of radio frequency (RF) units comprising the steps of:
    transmitting from a first RF unit a message announcing the presence of the first RF unit;
    receiving at the first RF unit an available bandwidth per mobile unit and response time from other members of the network, said available bandwidth being no less than a guaranteed minimum bandwidth;
    comparing available bandwidths and response times received from the other members;
    selecting one of the other members based on the comparison so as to provide a path with the guaranteed minimum bandwidth; and
    transmitting signals via the selected one of the other members.

7. The method of claim 6, further comprising the step of adjusting available bandwidths based upon corresponding signal strengths.

8. The method of claim 6, further comprising the step of adjusting packet size based upon a signal strength corresponding to the selected one of the other members.

9. A first mobile unit comprising:
    an adaptive personal router configured to perform the steps of
    measuring a response time from the first mobile unit to a gateway server;
    determining an available bandwidth, the available bandwidth representing throughput available per mobile unit if another mobile unit transmits to the gateway server via the first mobile unit;
    receiving a message announcing the presence of an other mobile unit;
    responding to the message by transmitting to the other mobile unit an indication of the available bandwidth and the response time if the available bandwidth is not less than a guaranteed minimum bandwidth.

10. A first mobile unit comprising:
    an adaptive personal router configured to perform the steps of
    announcing the presence of the first mobile unit;
    receiving a response time and an available bandwidth from a plurality of other devices connected to a network, the other devices belonging to the group consisting of a gateway server and other mobile units being in communication with the gateway server and having an available bandwidth not less than a guaranteed minimum bandwidth;
    comparing response times and available bandwidth received in the receiving step; and
    selecting a routing device from the plurality of other devices; and transmitting messages to the routing device.

11. The first mobile unit of claim 10, wherein the routing device is the gateway server.

12. The first mobile unit of claim 10, wherein the routing device is an other mobile unit.

13. The method of claim 12, wherein the other mobile unit is directly connected to the gateway server.

14. The method of claim 12, wherein the other mobile unit is connected to the gateway server through a third mobile unit.

* * * * *